June 10, 1947.  R. NEUSCHOTZ  2,421,902
MEANS OF EXPANDING PEARLITE AND LIKE SUBSTANCES
Filed Aug. 31, 1943
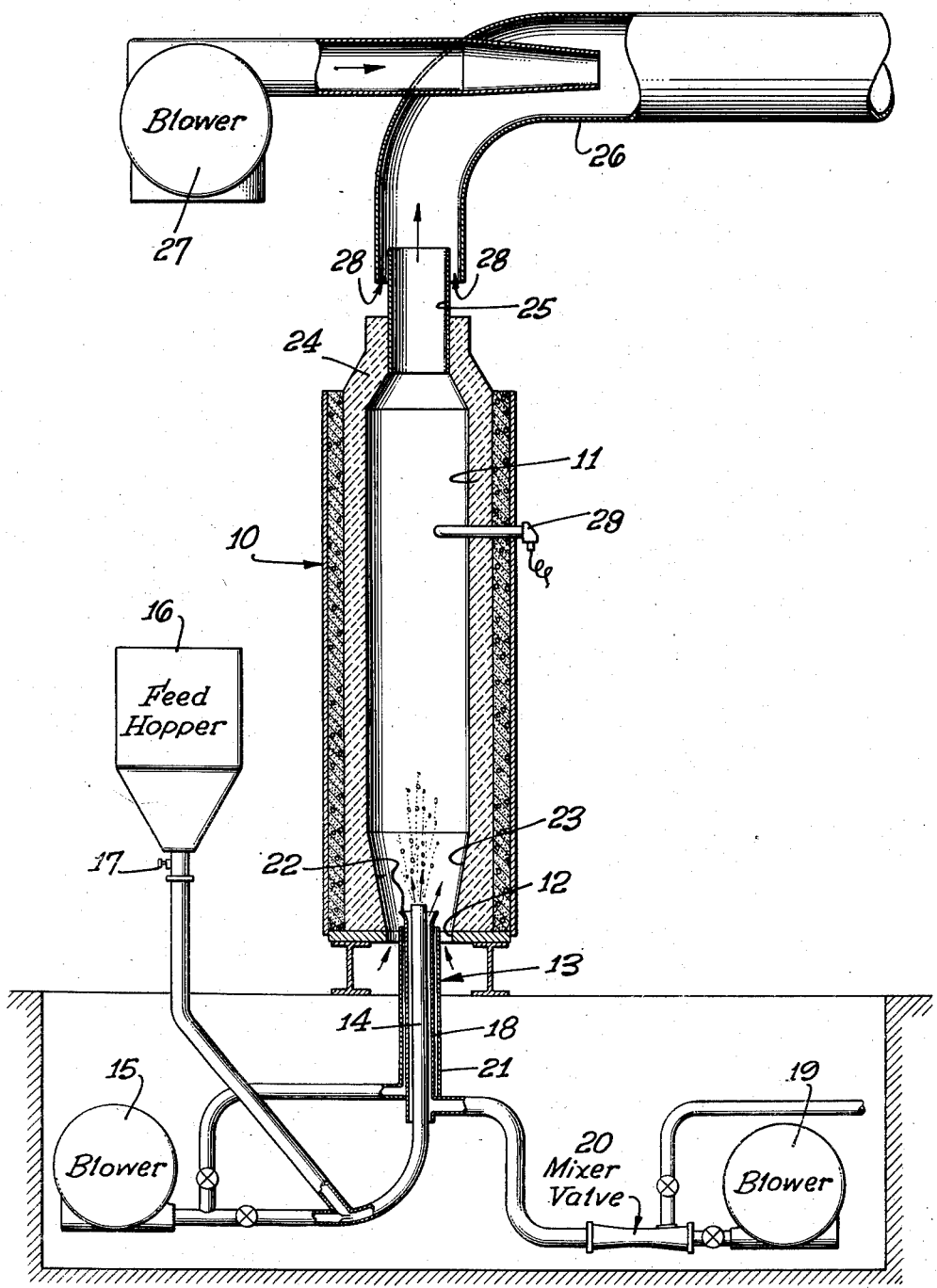
INVENTOR.
ROBERT NEUSCHOTZ,
BY Hazard and Miller
ATTORNEYS.

Patented June 10, 1947

2,421,902

UNITED STATES PATENT OFFICE 2,421,902

MEANS OF EXPANDING PEARLITE AND LIKE SUBSTANCES

Robert Neuschotz, Los Angeles, Calif.

Application August 31, 1943, Serial No. 500,657

16 Claims. (Cl. 263—21)

This invention relates to a method and means of expanding pearlite (sometimes spelled perlite), mica, and like expandible or exfoliating materials.

Pearlite is a brittle, friable mineral, black to pearl gray in color, the name being applied to it to distinguish it from obsidian, another form of volcanic glass. Pearlite is basically aluminum silicate containing appreciable amounts of other substances, such as soda, potash, lime, and magnesia. It contains usually in excess of 2% water of crystallization. When this mineral is subjected to a high temperature in the neighborhood of 2000° F. it begins to melt or become plastic. The water of crystallization is quickly converted into steam and expands the softened mineral, puffing or popping it to a volume ten times or more than its original volume. The resulting product has a wide variety of advantageous uses. Being in the nature of a glass it is inert to water and many acids and being highly porous and cellular, it possesses excellent heat insulating properties. As its density is quite low large volumes of it may be employed where weight is an important factor to be taken into consideration.

Heretofore pearlite has been popped or puffed by subjecting pearlite granules to high heat. However, difficulties have been experienced as follows: A short time element is involved in raising the temperature of the granules to that required to render them plastic. If the granules are fed into a zone of high temperature usually from three to five seconds time is required to bring the granules to the temperature wherein they are plastic and the steam generated by the water of crystallization can be effective to puff or expand them. When the granules have been rendered plastic and have been puffed or expanded, if they are allowed to remain in the zone of high temperature they will deposit on surrounding surfaces, form clinkers, and melt or coalesce into a glass somewhat in the nature of obsidian. It is therefore important and a primary feature of the present invention is to provide a means and method of expanding pearlite granules wherein the granules are fed into a zone of high temperature, allowed to remain there the necessary time to bring the granules to a plastic condition and cause the water of crystallization to expand them, and then immediately remove the expanded granules from the zone of high temperature and cool them so that they will not deposit or coalesce on surrounding surfaces, but instead, will be removed as a puffed, highly cellular product.

While the invention has been primarily designed for expanding pearlite, it is equally applicable to other like materials, such as mica which can be expanded or exfoliated. Many of the problems involved in expanding pearlite are also present in exfoliating vermiculites although they may be present to a somewhat smaller degree.

The present invention contemplates a method of expanding pearlite granules and like substances wherein the granules are fed into a furnace within which there is a zone of high temperature created by an upwardly directed burner. While the granules may be dropped in the furnace toward the zone of high temperature they are preferably discharged upwardly from within the burner into the furnace and then allowed to fall downwardly therein. The time required for the particles to ascend within the furnace and then to descend toward the flame provides an adequate time period within which the particles may be brought up to the required heat to cause them to be expanded or exfoliated.

As soon as the particles are expanded, due to their volume becoming greatly increased, the blast becomes effective to remove the expanded particles immediately from the vicinity of the flame or zone of high temperature. Thus, once that the particles have expanded they are conveniently and automatically removed so that they have no adequate opportunity to settle or deposit themselves on surrounding surfaces.

Frequently the mineral contains certain impurities such as obsidian that will not be expanded by the heat. If the water of crystallization present is very low, such as for example only one-half of one per cent, the particles will not be expanded to any noticeable or material extent. These particles which refuse to expand under the influence of heat, while they may be temporarily supported by the upwardly flowing blast, eventually settle therethrough and in this respect, the method is highly advantageous in that it not only satisfactorily puffs or expands the pearlite particles but also effects a continuous and automatic separation of any impurities or particles that refuse to be expanded under the influence of heat.

Another object of the invention is to provide a furnace for expanding pearlite or like materials wherein there is an upwardly directed burner in or adjacent the bottom thereof and disposed within a downwardly tapering throat through which outside air may be drawn. This tapering throat is designed to cause the incoming air and the products of combustion of the burner to ascend at gradually decreasing velocities. Thus at the bottom or narrow portion of the throat the upward velocity is a maximum while at a higher elevation in the throat the velocity is somewhat reduced. In this manner not only are the walls of the furnace adequately cooled but the particles are kept from depositing and coalescing thereon and as the particles fall in the zone of high temperature their rate of descent is constantly decreased to a point near the zone of highest temperature whereby an adequate opportunity is afforded for all particles susceptible of being expanded to be expanded.

A further object of the invention is to provide a furnace or apparatus for satisfactorily conducting the above-described method which makes adequate provision for protecting the walls of the furnace, enabling the process to be performed continuously and which also makes provision for handling and cooling the resulting product.

With the foregoing and other objects in view, which will be made apparent in the following detailed description and specifically pointed out in the appended claims, reference is had to the accompanying drawings for an illustrative embodiment of the invention, wherein the figure is a sectional view through a furnace embodying the present invention and enabling the process to be performed therein.

Referring to the accompanying drawing wherein similar reference characters designate similar parts throughout, the furnace in its preferred form comprises an outer wall structure indicated at 10, preferably in the form of an upright cylinder. The outer wall structure is preferably encased in a steel cylinder or shell as shown. Within this outer furnace wall structure there is a lining 11 of a suitable refractory material. The bottom of the furnace has an entrance adjacent the center thereof indicated at 12 and an upwardly directed burner, generally indicated at 13 extends therein. This burner is of somewhat unique construction and is primarily designed for accomplishing the purposes above set forth. It consists of a central tube 14 supplied with air from a blower 15 and into the air that is discharged through the central tube the pearlite in the form of granules is fed from a hopper 16. Preferably a vibrator type feed valve 17 is arranged at the bottom of the feed hopper to insure constant and fluent flow of the pearlite granules therefrom. The pearlite placed in the feed hopper is crushed and preferably screened so that the granules are in the neighborhood of 10 or 12 mesh size and smaller. These granules when fed into the air from the blower 15 are discharged upwardly through the central tube 14 centrally of the furnace. A second tube 18 is arranged concentrically around the inner tube 14. This tube is supplied with a mixture of air and gas or other fuel. The air is supplied from a suitable blower such as that indicated at 19, and fuel from any suitable source of supply is mixed therewith in a mixer valve 20. The air and fuel mixture are discharged upwardly in the space between the inner tube 14 and the outer tube 18.

Surrounding the outer tube there is still a further tube 21 which may be supplied with air from blower 15. This tube is arranged concentrically with relation to the tube 18 and centrally of the entrance 12. It will be noted that the tube 18 is flared outwardly as indicated at 22. This outward flaring is conducive to the creation of a short flame and also tends to direct the air blast issuing from the space between tubes 18 and 21 outwardly against the downwardly converging lower walls 23 of the furnace. In this manner, the air blast issuing from tube 21 is spread against the converging bottom of the furnace and a draft is created to draw in additional air through entrance 12 against these walls so as to adequately cool them.

At the top of the furnace the lining is constricted as at 24 and equipped with an outlet conduit 25 which extends into a suitable conduit 26 in spaced relation to the walls thereof. Conduit 26 serves to conduct off the puffed or expanded pearlite. Preferably, it discharges into a cyclone dust collector. A blower 27 may discharge into this conduit so as to induce a high velocity therein and to induce the admission of additional air through the space 28 which tends to cool the walls of the conduit and the expanded pearlite particles moving therethrough. The blower 27 may be arranged as illustrated, or may be arranged adjacent the end of the conduit 26 immediately ahead of the dust collector. There are advantages and disadvantages to both positions.

If the outlet from the blower 27 is arranged as indicated the pearlite particles may be more readily cooled thereby. However, the discharge from the blower is apt to form an impediment against the regular flow of the pearlite particles. Also, the speed at which the pearlite particles are discharged into the dust collector may be somewhat dissipated if the blower 27 is located too remote from the dust collector. If the blower is located in conduit 26 immediately ahead of the dust collector there is danger of the blades of the blower impinging the particles of expanded pearlite and unnecessarily reducing their size. Either position of the blower will normally produce satisfactory results.

29 indicates a thermo-coupling connected to a pyrometer of the indicating type or of an automatic temperature control.

The operation and advantages of the construction as above outlined are as follows: The pearlite granules together with air from blower 15 are discharged upwardly in the bottom of the furnace. As they rise therein they have an opportunity to become heated by the surrounding flame. These particles, after having been projected upwardly tend to fall downwardly toward the flame and during this falling, a further opportunity is afforded to heat the particles. The rise and fall of the granules adjacent the flame will ordinarily allow for the necessary time factor to elapse to bring the particles up to their puffing or expanding heat. When the particles are puffed or expanded their volume increases enormously with the result that their specific gravity is greatly decreased. The air blast which is directed upwardly through the furnace and which is composed of the air issuing from the inner tube 14, the products of combustion of the flame, and air issuing from the outer tube 21 and the additional air that is drawn into the bottom of the furnace through entrance 12 becomes immediately effective to sweep the popped or expanded pearlite up through the furnace and into the conduit 26. As these particles pass into the conduit 26 cool air is drawn into the conduit through space 28. This cool air is effective to quickly cool the particles and to maintain the walls of the conduit 26 adequately cooled. Some particles may delay in being popped or expanded. These particles may float temporarily on or around the flame and the adjacent air blast until they are ultimately popped or expanded and be then swept out of the furnace. Frequently, pearlite contains some impurities or obsidian or contain particles the percentage of water of crystallization of which is too low to effectively expand them. These particles after being temporarily supported or suspended around and over the flame ultimately drop through entrance 12. In this manner there is a constant and automatic separation of unexpandible particles from the expanded pearlite.

A difficulty encountered in expanding pearlite is the danger of the particles settling or collecting on the furnace walls. By the present construction it will be noted that a relatively large quantity of comparatively cool air is drawn inwardly and swept upwardly against the furnace walls. This cool air serves to maintain the lining surfaces adequately cool and tends to keep the pearlite particles moving at adequate velocity so that they will not stick or collect on the furnace walls. The introduction of air at space 28 tends to cool the particles after expansion and also to keep them from sticking to the walls of conduit 26. It will be noted that the bottom of the lining provides a downwardly tapered or constricted throat about the top of the burner. Consequently, air drawn therein is at a maximum upward velocity at the bottom of the throat, this velocity gradually decreasing upwardly. Those particles or granules which are discharged into the furnace on falling will consequently encounter an upwardly directed blast of high velocity but not of maximum velocity. As they continue to fall toward the burner or in other words, towards the zone of highest temperature they continually encounter the upward flow of air and products of combustion of continually increasing velocity. Consequently those particles which are readily expandible may be expanded some distance above the burner and on being expanded are immediately swept out of the furnace. Particles that are somewhat more difficultly expandible will descend toward the burner but will have their downward movement arrested or retarded by their encountering a high velocity. Those particles which are most difficult to expand will continue to settle towards the burner but as they approach the burner their downward movement is retarded to the maximum extent. In this way the particles that are fed into the furnace will tend to automatically stratify and arrange themselves at the level that will have the required temperature to effect their expansion. The improved furnace, therefore, is highly advantageous in that it effectively protects the walls of the furnace against particles coming in contact therewith and coalescing thereon. The walls are effectively kept cool and adequate time periods are permitted for the heating of the granules to the required temperature to effect their expansion. Furthermore, the construction is such as to cause the particles to automatically arrange themselves or stratify themselves in accordance with the temperatures required of them to effect their expansion, and those particles which refuse to be expanded entirely under the influence of heat are continuously and automatically separated by reason of the fact that they ultimately drop down between the burner and the walls of the bottom of the furnace.

From the above-described construction it will be appreciated that a novel, simple, and advantageous means and method of expanding pearlite has been developed which can be continuously operated and which will serve to satisfactorily expand the pearlite granules. Adequate precaution is taken against the depositing of granules on the furnace walls and the conduit leading therefrom. The construction also adequately makes provision allowing sufficient time to elapse after the particles are brought into the vicinity of the flame to enable popping. The construction is further advantageous in that if among the particles or granules fed to the furnace there are unexpandible impurities, automatic and continuous separation of these particles takes place. Further, larger particles will tend to remain in the burner flame area longer and thus expand fully, while small particles which do not require as much time for the heat to penetrate them will be segregated in the higher section where they may be expanded in the lower velocity area of the furnace.

Various changes may be made in the details of construction without departing from the spirit and scope of the invention as defined by the appended claims.

I claim:

1. A furnace for expanding pearlite granules and the like comprising means providing walls, an upwardly directed burner centrally thereof, means for discharging granules upwardly through the burner, and means providing an upwardly directed air blast about the burner.

2. A furnace for expanding pearlite granules and the like comprising means providing walls, an upwardly directed burner centrally thereof, means for discharging granules upwardly through the burner, and means providing an upwardly directed air blast about the burner, said refractory walls converging downwardly about the air blast.

3. A furnace for expanding pearlite granules and the like comprising means providing walls, an upwardly directed burner centrally thereof, means for discharging granules upwardly through the burner, means providing an upwardly directed air blast about the burner, and means for inducing flow out of the top of the furnace.

4. A burner for furnaces for expanding pearlite granules and the like comprising means providing a central duct through which pearlite granules and air may be discharged, means providing a surrounding duct through which fuel may be discharged, and means providing a surrounding outer duct through which air may be discharged, said outer duct being arranged to spread the air outwardly with relation to the discharging fuel.

5. A burner for furnaces for expanding pearlite granules and the like comprising means providing a central duct through which pearlite granules and air may be discharged, means providing a surrounding duct through which fuel may be discharged, and means providing an outer duct through which air may be discharged, the exit of the surrounding duct being flared as and for the purpose described.

6. A furnace for expanding pearlite granules and the like comprising means providing walls, an upwardly directed central duct through which pearlite granules and air may be discharged within the furnace, means providing a surrounding duct through which fuel may be discharged, means providing an outer duct through which air may be discharged, there being a space between the outer duct and the walls of the furnace through which heavy particles may drop and air may be drawn into the furnace.

7. A furnace for expanding pearlite granules and the like comprising means providing walls, an upwardly directed central duct through which pearlite granules and air may be discharged within the furnace, means providing a surrounding duct through which fuel may be discharged, means providing an outer duct through which air may be discharged, there being a space between the outer duct and the walls of the furnace through which air may be drawn into the furnace, the walls of the furnace converging downwardly adjacent said ducts.

8. A furnace for expanding pearlite granules and the like comprising means providing walls, an upwardly directed burner arranged centrally of the walls, means for feeding granules to be expanded into the flame of the burner and means for supplying air between the flame of the burner and said walls to cool the walls and assist in carrying the expanded product upwardly.

9. A furnace for expanding pearlite granules and the like comprising means providing walls, an upwardly directed burner arranged centrally of the walls, means for feeding granules to be expanded into the flame of the burner, and means for discharging air outwardly and upwardly about said burner adjacent said walls.

10. A furnace for expanding pearlite granules and the like comprising means providing walls, an upwardly directed central duct through which pearlite granules and air may be discharged into the furnace, a surrounding duct through which fuel may be discharged, and an outer duct through which air may be discharged, the end of the outer duct being so formed as to direct the air issuing therefrom outwardly and upwardly adjacent said walls.

11. A furnace for expanding pearlite granules and the like comprising means providing walls, an upwardly directed burner arranged centrally of the walls, means for feeding granules to be expanded into the flame of the burner, and means for discharging air outwardly and upwardly about said burner adjacent said walls, said walls converging downwardly adjacent the burner whereby the air and products of combustion passing upwardly between the walls will have their upward velocity progressively decreased.

12. A furnace for expanding pearlite granules and the like comprising means providing walls, an upwardly directed central duct through which pearlite granules and air may be discharged into the furnace, a surrounding duct through which fuel may be discharged, and an outer duct through which air may be discharged, the end of the outer duct being so formed as to direct the air issuing therefrom outwardly and upwardly adjacent said walls, said walls converging downwardly about said ducts.

13. A furnace for expanding pearlite granules and the like comprising means providing walls, an upwardly directed central duct through which pearlite granules and air may be discharged into the furnace, a surrounding duct through which fuel may be discharged, and an outer duct through which air may be discharged, the end of the outer duct being so formed as to direct the air issuing therefrom outwardly and upwardly adjacent said walls, said walls being disposed in spaced relation to said outer duct whereby air may be drawn into the furnace and heavy particles that refuse to expand may descend therethrough.

14. Apparatus for the exfoliation of Perlite ore or the like comprising in combination an elongated, vertical cylindrical furnace having openings at opposite ends, a conduit in communication with the upper end of said furnace adapted to receive the exfoliated ore and combustion gases, a burner located in the center of the lower opening of said furnace, said burner having a central conduit for feeding ore into said furnace by means of a stream of air, an intermediate annular space surrounding said central conduit for introducing a combustible mixture of air and gas into said furnace and an annular space surrounding said intermediate annular space for the introduction of air to cool the walls of said furnace.

15. Apparatus for the exfoliation of Perlite ore or the like comprising a conduit in communication with one end of said furnace adapted to receive the exfoliated ore and combustion gases, a burner located in the center of the other end of said furnace said burner having a central conduit parallel with the furnace for feeding ore into said furnace by means of a stream of air, an intermediate annular space surrounding said central conduit for introducing a combustible mixture of gas and air into said furnace and an outer annular space surrounding said intermediate annular space for the introduction of auxiliary air into said furnace thereby cooling the walls of said furnace to prevent formation of clinkers on said walls by contact with hot exfoliated ore, said intermediate and outer annular spaces being parallel to said central conduit for the introduction of air and gas.

16. A furnace for expanding pearlite granules and the like comprising means providing walls, a burner arranged centrally of the walls, means for feeding granules to be expanded into the flame of the burner and means for supplying air between the flame of the burner and said walls to cool the walls and assist in carrying the expanded product out of the furnace.

ROBERT NEUSCHOTZ.

REFERENCES CITED

The following references are of record in the file of this patent:

UNITED STATES PATENTS

| Number | Name | Date |
| --- | --- | --- |
| 1,922,448 | Miner | Aug. 15, 1933 |
| 1,513,622 | Manning | Oct. 28, 1924 |
| 1,648,856 | McEwen | Nov. 8, 1927 |
| 748,894 | Trump | Jan. 5, 1904 |
| 1,666,656 | Honigmann | Apr. 17, 1928 |
| 920,333 | Hughes | May 4, 1909 |
| 920,334 | Hughes | May 4, 1909 |
| 1,311,235 | Kemp | July 29, 1919 |